United States Patent [19]

Ogawa

[11] 4,372,659
[45] Feb. 8, 1983

[54] APPARATUS FOR TAKING A CONTINUOUS PHOTOGRAPH OF THE EXTERIOR OF AN ARTICLE

[76] Inventor: Tadahiro Ogawa, Tokyo, Japan

[21] Appl. No.: 285,276

[22] Filed: Jul. 20, 1981

[51] Int. Cl.³ .................... G03B 29/00; G03B 15/06
[52] U.S. Cl. ................................. 354/80; 354/290
[58] Field of Search .................. 354/80, 81, 290–294

[56] References Cited

U.S. PATENT DOCUMENTS

| | | | |
|---|---|---|---|
| 2,140,602 | 12/1938 | Simjian | 354/290 |
| 2,967,455 | 1/1961 | McCormack | 354/80 X |
| 3,690,242 | 9/1972 | Cruickshank | 354/290 |
| 3,833,196 | 9/1974 | Protzman | 354/293 X |
| 4,236,795 | 12/1980 | Kephart | 354/80 |

FOREIGN PATENT DOCUMENTS 439448 12/1935 United Kingdom ............... 354/81

*Primary Examiner*—Donald A. Griffin
*Attorney, Agent, or Firm*—Gifford, VanOphem, Sheridan & Sprinkle

[57] ABSTRACT

This invention relates to an apparatus for taking a single, continuous photograph of the exterior of an article consisting of a center disk on which an article is to be placed and a larger concentric disk on which a slit camera, a light projector for illuminating the exterior of said article, a reflector for reflecting the light from said illuminated surface into the slit camera and a non-reflective background are placed, wherein either of said disks can rotate against the other.

5 Claims, 2 Drawing Figures

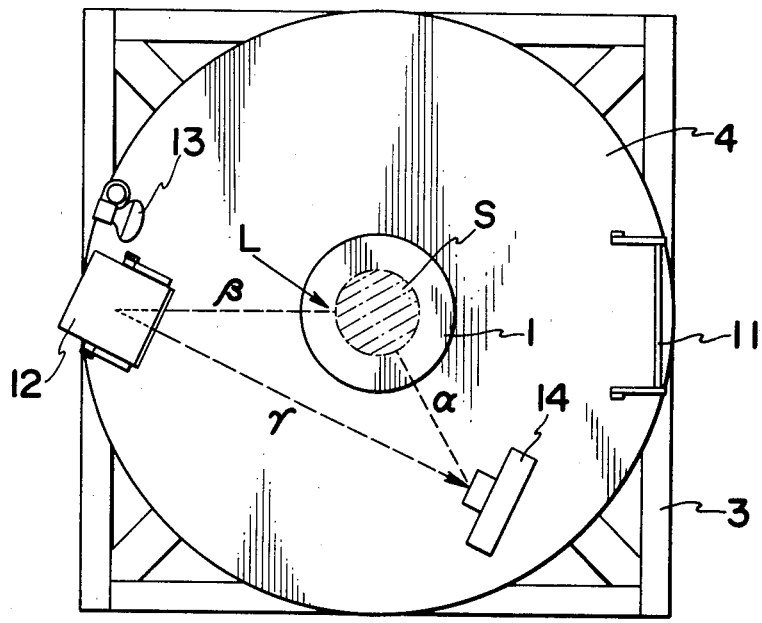

APPARATUS FOR TAKING A CONTINUOUS PHOTOGRAPH OF THE EXTERIOR OF AN ARTICLE

SUMMARY OF THE INVENTION

This invention relates to an apparatus for taking a single, continuous photograph of the exterior of an article consisting of a center disk on which an article is to be placed and a larger concentric disk on which a slit camera, a light projector for illuminating the periphery of the article, a reflector for reflecting the light from the illuminated surface into the slit camera and a non-reflecting background are placed wherein either of said disks can rotate against the other.

One can see the entire exterior circumference of the article at a glance in the photograph taken by this apparatus and can fully appreciate the picture painted or engravings displayed on the surfaces without foreshortening of the view thus obtained.

When the article is fragile, such as porcelain or glass, the center disk on which such an article is to be placed should be held stationary while the concentric disk is rotated about it. Otherwise, if the center disk rotated with such a fragile article upon it, the risk of cracking or breaking the article by falling during rotation would not be avoided. On the contrary, if the article is of hard and sturdy construction such as metallic or wooden, it may be rotated upon the center disk.

BRIEF DESCRIPTION OF THE DRAWING

In the accompanying drawings, an embodiment of the invention is shown wherein the center disk is held stationary while the concentric disk rotates, in which FIG. 1 is a plan view, and FIG. 2 is a side view of the apparatus.

DETAILED DESCRIPTION OF THE PREFERRED EMBODIMENT OF THE PRESENT INVENTION (1) is a center disk on which a fragile article (S) such as porcelain or glass is mounted. (4) is a larger concentric disk on which a slit camera (14), a light projector (13) (for illuminating the exterior of said article), a reflector (12) (for reflecting the light along effective lines of sight ($\beta$) ($\gamma$) from the illuminated exterior to the slit camera (14)), and a non-reflective background (11) are placed.

The concentric disk (4) is provided with a tubular supporting shaft (5) rotatively mounted on the base of the frame-work (3) by means of ball bearings (16). In said tubular shaft, the supporting shaft (2) of the center disk (1) is inserted and its opposite end is fixed to the base of the frame-work (3).

In the slit camera (14), film is fed continuously behind a slit. The velocity and direction of the film are proportional to those of the concentric disk (4).

The tubular shaft (5) is driven by an electric motor (7) by means of a belt (10) engaging with a pulley (6) attached to the shaft (5) and a pulley (9) attached to the motor shaft (8).

The slit camera (14) is mounted on a universal joint (15) whereby its angle of elevation can be adjusted in accordance with the height (H) of the article (S).

The photograph of the entire exterior of the article (S) can be taken by one complete rotation of the concentric disk (4) and one can appreciate the picture or engravings displayed on the exterior of the article (S) at a glance.

As is obvious from the drawing, by means of a reflector (12), the effective line of sight, $(\beta)+(\gamma)$, from the slit camera (14) to the article (S) may be substantially longer than the distance ($\alpha$) from the slit camera (14). Thus, the diameter of the concentric disk (4) as well as the size of the whole apparatus can be reduced.

Instead of a plane reflector (12), a convex or concave mirror, or their combination may be employed as reflector for compensating the curvature of the surface.

When the article (S) is of hard and sturdy construction such as metallic or wooden, it may be placed on a rotating center disk (1), while the concentric disk (4) is held stationary.

What I claim:

1. An apparatus for taking a single, continuous photograph of the exterior of an article comprising:

a central disk adapted for placement of said article thereupon;

an outer disk coaxial with said central disk, the positions of said central disk and said outer disk being rotatable relative to one another; and a slit camera positioned on said outer disk for taking said photograph, said slit camera having an effective line of sight which is essentially perpendicular to the exterior of said article, said article and said camera thereby being rotatable relative to one another;

wherein the velocity and direction of the film fed behind the slit in said slit camera are porportional to the speed and direction of rotation of said object relative to said camera.

2. The apparatus according to claim 1 further comprising a light source for illuminating that portion of said exterior of said object which lies along the effective line of sight of said slit camera.

3. The apparatus according to claim 1 further comprising a non-reflective background behind said article along said effective line of sight thereby reducing the introduction of extraneous light into said camera.

4. The apparatus according to claim 1 further comprising a reflector for increasing the length of said effective line of sight from said slit camera to said article.

5. The apparatus according to claim 1 further comprising means for driving said central disk and said outer disk relative to each other.

* * * * *

UNITED STATES PATENT AND TRADEMARK OFFICE
CERTIFICATE OF CORRECTION

PATENT NO. : 4,372,659

DATED : February 8, 1983

INVENTOR(S) : Tadahiro Ogawa

It is certified that error appears in the above—identified patent and that said Letters Patent is hereby corrected as shown below:

Column 1, line 27, after "breaking" insert --of--.

Column 1, line 50, delete "tublar" and insert --tubular--, same line, delete "suppoting" and insert --supporting--.

Column 2, line 26, delete "calim" and insert --claim--.

Column 2, line 41, delete "porportional" and insert --proportional--.

Signed and Sealed this

Thirty-first Day of May 1983

[SEAL]

Attest:

DONALD J. QUIGG

Attesting Officer

Acting Commissioner of Patents and Trademarks